US012664054B2

(12) United States Patent
Park et al.

(10) Patent No.: US 12,664,054 B2
(45) Date of Patent: Jun. 23, 2026

(54) COORDINATED BACKUP OF FAILOVER DATABASES ACROSS MULTIPLE DATACENTERS

(71) Applicant: Rubrik, Inc., Palo Alto, CA (US)

(72) Inventors: Benjamin Joonsu Park, San Jose, CA (US); Deepti Kochar, San Mateo, CA (US); Lin Huang, Morgan Hill, CA (US); Andrew Cristopher Keirn, San Diego, CA (US); Arvind Swaminathan, Chennai (IN)

(73) Assignee: Rubrik, Inc., Palo Alto, CA (US)

( * ) Notice: Subject to any disclaimer, the term of this patent is extended or adjusted under 35 U.S.C. 154(b) by 16 days.

(21) Appl. No.: 18/774,405

(22) Filed: Jul. 16, 2024

(65) Prior Publication Data

US 2026/0023662 A1 Jan. 22, 2026

(51) Int. Cl.
*G06F 11/1446* (2026.01)
*G06F 11/20* (2006.01)

(52) U.S. Cl.
CPC ...... *G06F 11/1458* (2013.01); *G06F 11/1464* (2013.01); *G06F 11/2025* (2013.01); *G06F 11/2053* (2013.01); *G06F 2201/84* (2013.01)

(58) Field of Classification Search
CPC ............. G06F 11/1446; G06F 11/1458; G06F 11/1464; G06F 11/2025; G06F 11/2053; G06F 11/2056; G06F 11/2058; G06F 11/2094
See application file for complete search history.

(56) References Cited

U.S. PATENT DOCUMENTS

| | | | |
|---|---|---|---|
| 2005/0071710 A1* | 3/2005 | Micka ................ | G06F 11/2074 714/E11.107 |
| 2018/0113632 A1* | 4/2018 | Sancheti ............ | G06F 11/2048 |
| 2019/0012238 A1* | 1/2019 | Butterworth ........ | G06F 11/2048 |
| 2022/0229740 A1* | 7/2022 | Fernandes ............ | G06F 16/256 |
| 2024/0036989 A1* | 2/2024 | Deguchi ............. | G06F 11/1469 |

* cited by examiner

*Primary Examiner* — Michael Maskulinski

(74) *Attorney, Agent, or Firm* — Holland & Hart LLP

(57) ABSTRACT

Methods, systems, and devices for data management are described. Techniques described herein may enable a database management system (DMS) to link databases of a failover group that spans multiple data centers across different clusters for the different datacenters. For example, a centralized control entity may indicate to the clusters in different datacenters that one or more databases in a first datacenter are in a same failover group as one or more other databases in a second datacenter. A database of the first datacenter may be a primary backup database from which a first cluster in the first datacenter may obtain transaction log backups. The first cluster of the datacenter may replicate the backups to a second cluster of a second datacenter, which may enable the second cluster to refrain from obtaining backups from a secondary backup database within the second datacenter.

20 Claims, 8 Drawing Sheets

Backup Obtaining Manager

525

Backup Storing Manager

535

Database Priority Manager

545

Backup Outputting Manager

530

Failover Identifying Manager

540

SLA Manager

550

520

500

Figure 7:
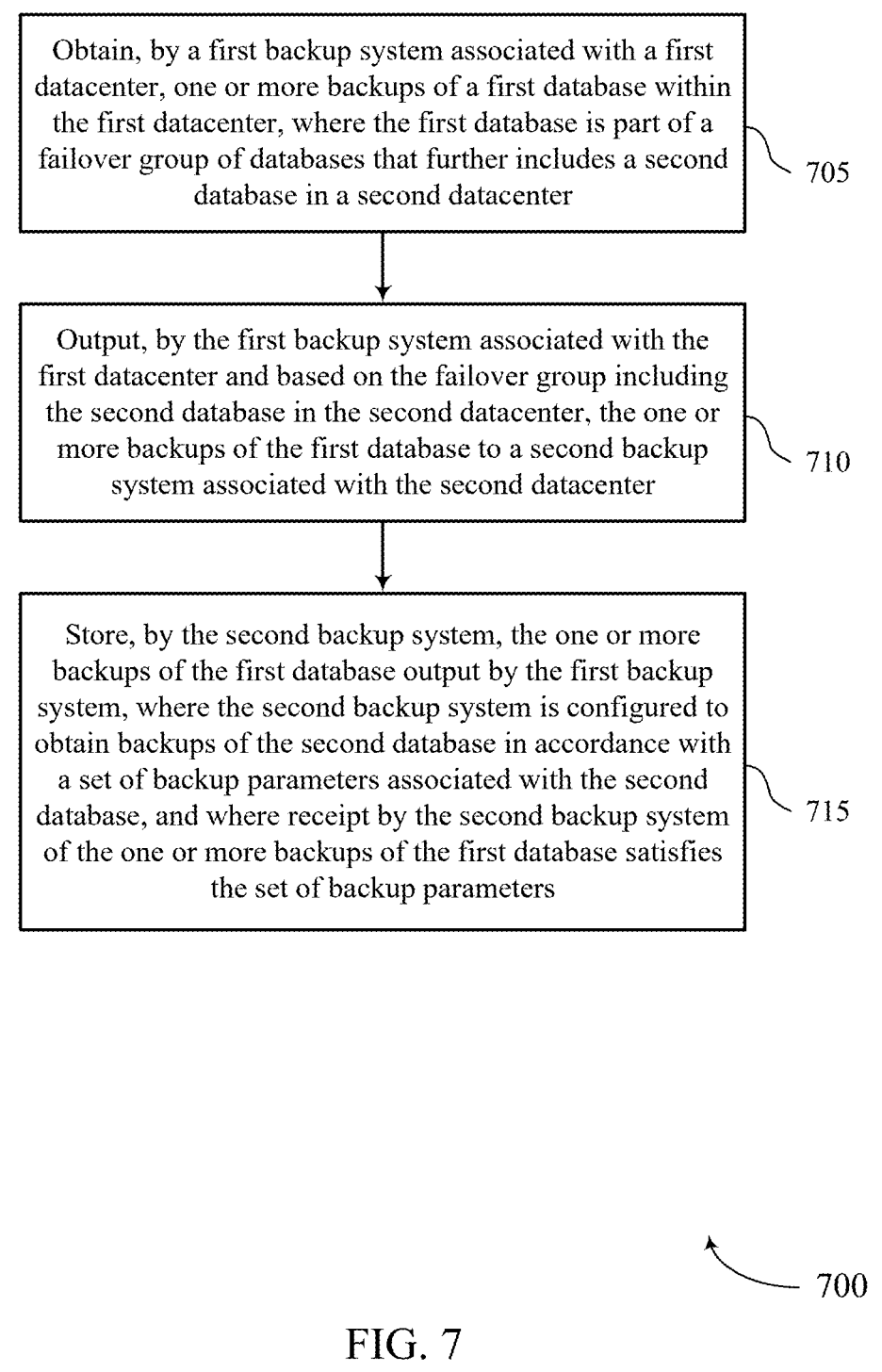

Obtain, by a first backup system associated with a first datacenter, one or more backups of a first database within the first datacenter, where the first database is part of a failover group of databases that further includes a second database in a second datacenter

705

Output, by the first backup system associated with the first datacenter and based on the failover group including the second database in the second datacenter, the one or more backups of the first database to a second backup system associated with the second datacenter

710

Store, by the second backup system, the one or more backups of the first database output by the first backup system, where the second backup system is configured to obtain backups of the second database in accordance with a set of backup parameters associated with the second database, and where receipt by the second backup system of the one or more backups of the first database satisfies the set of backup parameters

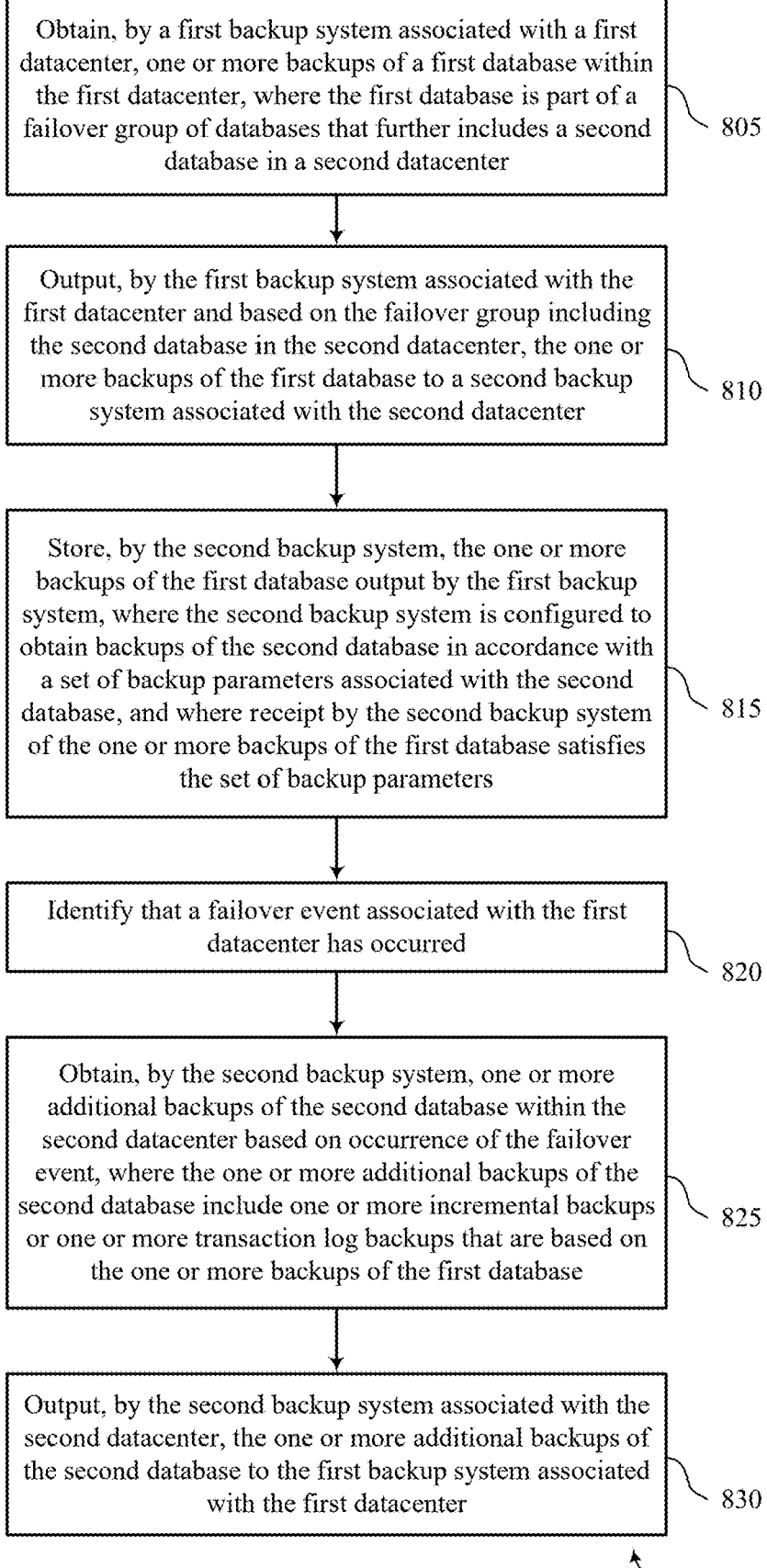

Obtain, by a first backup system associated with a first datacenter, one or more backups of a first database within the first datacenter, where the first database is part of a failover group of databases that further includes a second database in a second datacenter

805

Output, by the first backup system associated with the first datacenter and based on the failover group including the second database in the second datacenter, the one or more backups of the first database to a second backup system associated with the second datacenter

810

Store, by the second backup system, the one or more backups of the first database output by the first backup system, where the second backup system is configured to obtain backups of the second database in accordance with a set of backup parameters associated with the second database, and where receipt by the second backup system of the one or more backups of the first database satisfies the set of backup parameters

815

Identify that a failover event associated with the first datacenter has occurred

820

Obtain, by the second backup system, one or more additional backups of the second database within the second datacenter based on occurrence of the failover event, where the one or more additional backups of the second database include one or more incremental backups or one or more transaction log backups that are based on the one or more backups of the first database

825

Output, by the second backup system associated with the second datacenter, the one or more additional backups of the second database to the first backup system associated with the first datacenter

COORDINATED BACKUP OF FAILOVER DATABASES ACROSS MULTIPLE DATACENTERS

FIELD OF TECHNOLOGY

The present disclosure relates generally to data management, including techniques for coordinated backup of failover databases across multiple datacenters.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 7 and 8 show flowcharts illustrating methods that support coordinated backup of failover databases across multiple datacenters in accordance with aspects of the present disclosure.

DETAILED DESCRIPTION

Figure 1:
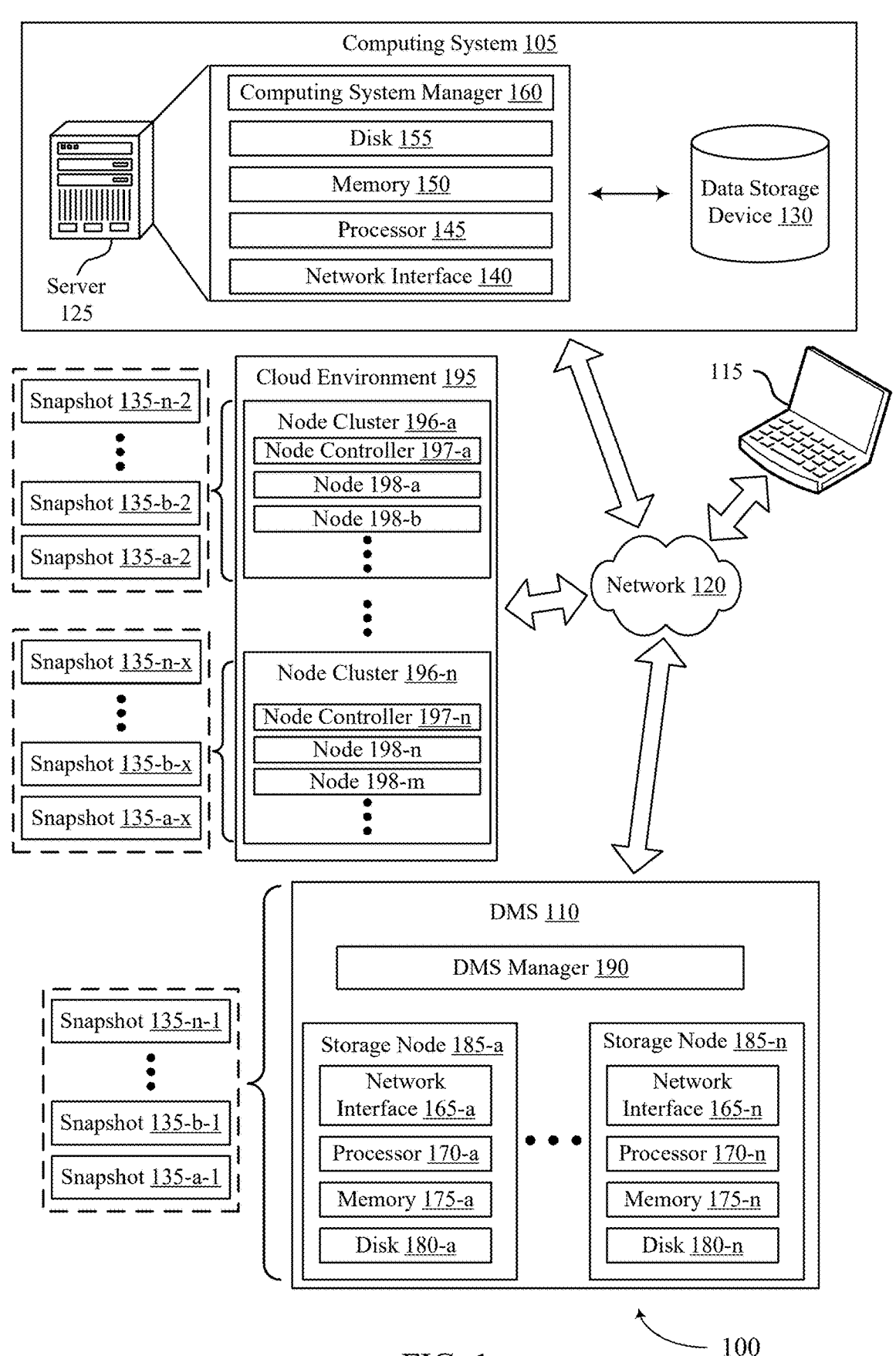
FIG. 1 illustrates an example of a computing environment that supports coordinated backup of failover databases across multiple datacenters in accordance with aspects of the present disclosure.

A database management system (DMS) may include clusters of storage nodes and other sub-systems that provide backup and recovery services for customer computing systems (e.g., databases). In some examples, a customer computing system may include one or more databases in a first datacenter and one or more databases in a second datacenter that are collectively part of a failover group (e.g., an availability group). That is, due to being part of the same failover group, the one or more databases in each datacenter may be replicas of a same database. For example, a first database may be a production database that may be used for active transactions, and other databases in the failover group may be replicas that are maintained of the production database. Another database of the failover group may be a primary backup database that may be assigned by the DMS to obtain backups of the failover group. In some examples, the DMS may include multiple clusters of storage nodes with a different cluster of storage nodes in each datacenter, and the cluster within a datacenter may obtain backups (e.g., transaction log backups including data written to the respective database) of one of the databases in that same datacenter periodically.

In some examples, however, each cluster may not be aware of the databases of the failover group that are in a different datacenter. Accordingly, in case of a failover in which the primary database within the failover group shifts from being a database in a first datacenter to being a database in a second datacenter, a second cluster in the second datacenter may not have access to backups taken by a first cluster in the first datacenter. Accordingly, the second cluster may obtain a full snapshot of the database, rather than an incremental snapshot, thereby increasing processing at the second cluster. Further, if a second cluster attempts to obtain backups of transaction logs for the failover group (e.g., by requesting the transaction logs from a database in the second datacenter) that have already been provided to the first cluster by a database in the first datacenter, the second cluster may not obtain the transaction logs. For example, the second database may not provide transaction logs that have already been provided by the database in the first datacenter, which the second cluster may identify as a transaction log break. Additionally, the second cluster may not be aware of a service-level agreement (SLA) assigned by a user to a first cluster of the first datacenter, and the user may therefore manually reassign the SLA to the second cluster.

Accordingly, techniques described herein may enable a DMS to link databases of a failover group that spans multiple data centers across different clusters for the different datacenters. For example, a centralized (e.g., cloud-based) control entity may indicate to the clusters in different datacenters that one or more databases in one datacenter are in a same failover group as one or more other databases in one or more other datacenters. A database of a first datacenter may be a primary backup database from which a first cluster in the first datacenter may obtain transaction log backups. The first cluster of the first datacenter may replicate the backups to a second cluster of a second datacenter. This may allow the second cluster to identify that the SLA has been satisfied, which may enable the second cluster to refrain from obtaining backups from a secondary backup database within the second datacenter. The second cluster may thereby avoid falsely identifying a transaction log break.

Additionally, or alternatively, each cluster may identify which backups have been taken across the failover group as a whole, and thus the second cluster may use backups taken by the first cluster for subsequent backups in case of a failover event. After failover, the second cluster may therefore refrain from obtaining a full snapshot, which may reduce processing and storage usage for the second cluster (e.g., as well as one or more other clusters to which the backups are replicated). Such techniques may also enable a user to assign a failover group-level SLA to all clusters for all databases in the failover group, which may improve user experience by reducing user intervention in case of a failover.

FIG. 1 illustrates an example of a computing environment 100 that supports coordinated backup of failover databases across multiple datacenters in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples of the computing environment 100, a DMS 110 may include one or more databases (e.g., data storage devices 130) that are part of a failover group. For example, each database of the failover group may be a replica of a same database. In some examples, the DMS 110 may link databases of a failover group that spans multiple data centers across different clusters 196 in each datacenter. For example, a centralized (e.g., cloud-based) control entity may indicate to clusters 196 in different datacenters that one or more databases in one datacenter are in a same failover group as one or more other databases in one or more other datacenters.

In some examples, a first database of a first datacenter may be a primary backup database from which a first cluster 196 in the first datacenter may obtain transaction log backups. The first cluster 196 of the datacenter may replicate the backups to a second cluster 196 of a second datacenter. This may allow the second cluster 196 to identify that the SLA has been satisfied, which may enable the second cluster to refrain from obtaining backups from a secondary backup database within the second datacenter. The second cluster 196 may thereby avoid falsely identifying a transaction log break and may refrain from obtaining a full snapshot of a second database of the second datacenter, which may reduce processing and storage usage for the second cluster (e.g., as well as the other clusters to which the backups are replicated).

Additionally, or alternatively, each cluster 196 may identify which backups have been taken across the failover group as a whole, and thus the second cluster 196 may use backups taken by the first cluster 196 for subsequent backups in case of a failover event. For example, after failover, the second cluster 196 may use the backups taken by the first cluster 196 as a basis for one or more additional backups of the second database. The second cluster 196 may therefore refrain from obtaining a full snapshot.

Figure 2:
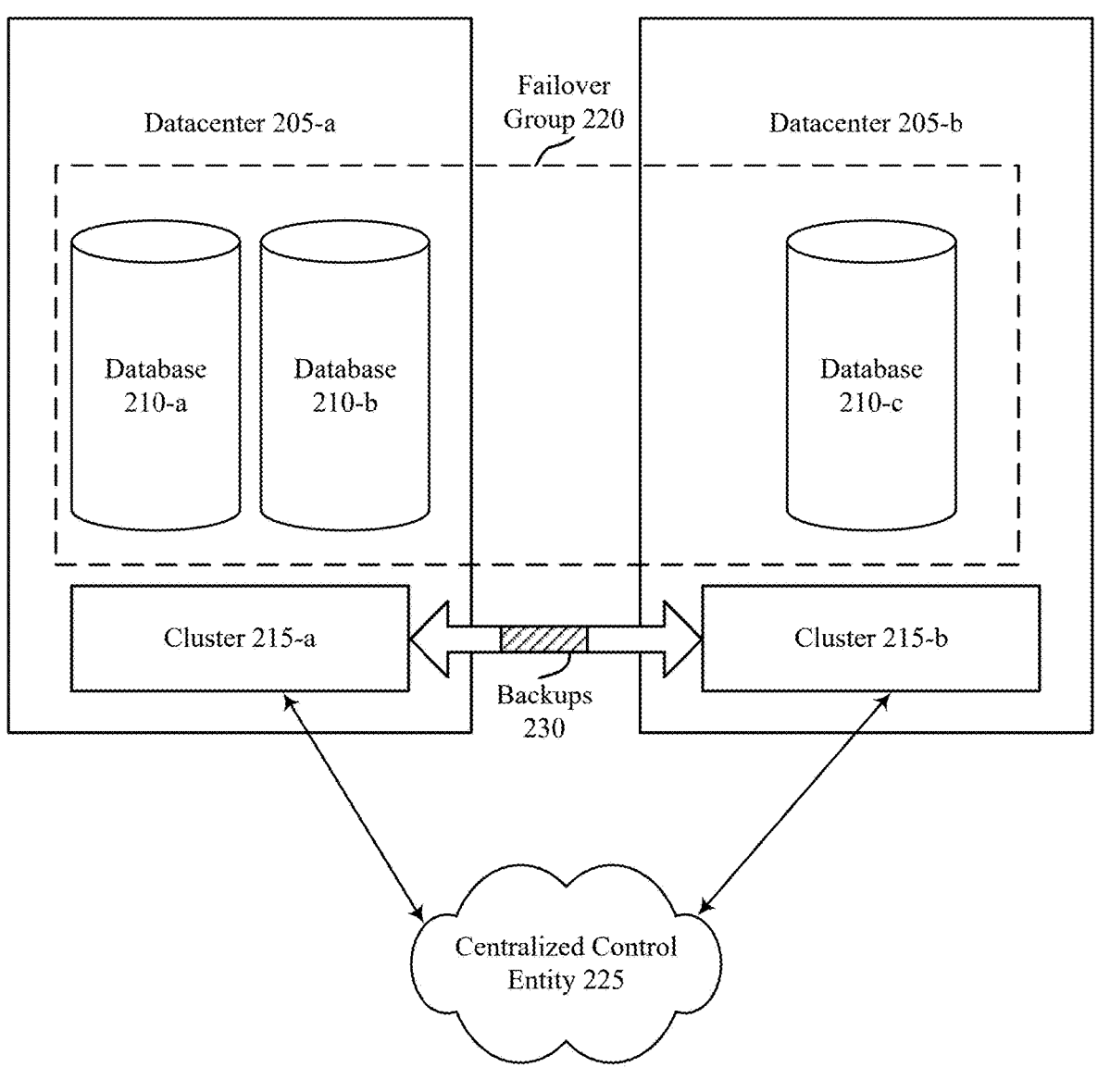
FIG. 2 shows an example of a computing environment that supports coordinated backup of failover databases across multiple datacenters in accordance with aspects of the present disclosure.

FIG. 2 shows an example of a computing environment 200 that supports coordinated backup of failover databases across multiple datacenters in accordance with aspects of the present disclosure. The computing environment 200 may incorporate or be incorporated by aspects of the computing environment 100. For example, the computing environment 200 may include one or more datacenters 205 (e.g., a datacenter 205-a and a datacenter 205-b), one or more databases 210 (e.g., a database 210-a, a database 210-b, and a database 210-c), and one or more clusters 215 (e.g., a cluster 215-a and a cluster 215-b), which may be examples of the corresponding entities as described with reference to FIG. 1.

In some examples, a user of a DMS may establish a failover group 220 (e.g., an availability group) of databases 210. The failover group 220 may include multiple databases that may be replicas of a first database 210 (e.g., a production database that may be in use by the user). Accordingly, in the case of a failover of the first database 210, the user may use a second database 210 of the failover group 220 as the production database.

In some examples, to increase security of the databases 210 of the failover group 220 in the event of a failover, the user may add one or more databases 210 (e.g., a database 210-a and a database 210-b) of a datacenter 205-a and one or more databases (e.g., a database 210-c) of a datacenter 205-b to the failover group 220. That is, the failover group 220 may include databases from two or more datacenters 205. Such techniques may enable the user to use the database 210-c as the production database in the event of a failover of the datacenter 205-a.

In some examples, each datacenter 205 may include a cluster 215 (e.g., a storage cluster, a cluster of storage nodes, a backup system) that may obtain backups 230 from the databases 210 of the respective datacenter 205. For example, the datacenter 205-a may include a cluster 215-a that may obtain backups 230 (e.g., full backups, incremental backups, transaction log backups) of the database 210-a and/or the database 210-b. The datacenter 205-b may include a cluster 215-b that may obtain backups 230 of the database 210-c. In some examples, the clusters 215 may obtain backups 230 according to one or more SLAs, which may be a set of backup parameters, such as parameters defining a periodicity for the clusters 215 to obtain full backups and/or transaction log backups of the respective databases 210. In some examples, transaction log backups may be backups 230 of changes (e.g., data that has been written to the database 210) that may enable the user to identify continuous points in time to which the user may restore the database 210.

In some examples, the clusters 215 may not be aware of one or more databases 210 in different datacenters 205 that are part of the failover group 220. The clusters 215 may therefore not be aware of or have access to backups 230 of the failover group 220 taken by a different cluster 215. Thus, the cluster 215-b may not use a backup 230 taken by the cluster 215-a as a basis for a subsequent backup 230 taken by the cluster 215-b (e.g., and vice-versa). Accordingly, failover groups 220 spanning multiple datacenters 205 may result in the clusters 215 obtaining relatively more full snapshots of the respective databases 210 than examples in which a cluster 215 has access to all backups 230 taken of databases 210 in the failover group 220.

As an illustrative example, the user may use the database 210-a as a production database and the database 210-b as a primary backup database from which the cluster 215-a may obtain backups 230 (e.g., transaction log backups) according to a first SLA. The cluster 215-b may obtain backups 230 (e.g., transaction log backups) of the database 210-c according to a second SLA (e.g., a same or different SLA as the cluster 215-a). In some examples, the database 210-b may truncate one or more transaction logs associated with the failover group 220 to enable the cluster 215-a to obtain the backups 230. However, the truncation may prevent the database 210-c from providing the transaction logs to the cluster 215-b (e.g., and similarly from the database 210-b from providing transaction logs to the cluster 215-a that have been truncated by the database 210-c). Accordingly, the cluster 215-b may identify a transaction log break and may obtain a full backup (e.g., a full snapshot) of the database 210-c to satisfy the second SLA. Such full snapshots may be untenable for relatively larger databases due to a relatively longer duration associated with obtaining the full snapshots, and may prevent the user from using change block tracking (CBT). The transaction log break may additionally be reported as an error to the user, which may result in a relatively larger quantity of failures being reported and therefore may reduce a satisfaction of the user.

Additionally, or alternatively, the cluster 215-b may refrain from obtaining backups 230 of the database 210-c until a failover event occurs at the datacenter 205-a. For example, in the event of a failover of the datacenter 205-a, the user may assign the second SLA to the cluster 215-b and thereby instruct the cluster 215-b to obtain backups 230 of the database 210-c (e.g., and remove the first SLA from the cluster 215-a as the database 210-a and the database 210-b may be on standby). The cluster 215-b may not have access to backups 230 obtained by the cluster 215-a and may therefore obtain a full backup (e.g., a full snapshot) of the database 210-c to satisfy the second SLA. Such techniques may increase processing and storage use of the cluster 215-b, and may reduce user experience (e.g., due to user intervention to reassign the SLA to the cluster 215-b in the event of a failover).

Accordingly, techniques described herein may enable a cluster 215-b to access backups 230 of databases 210 of a failover group 220 that were obtained by a cluster 215-a in a different datacenter 205. For example, each cluster 215 may be a replication target for each other cluster 215 with databases 210 in the same failover group 220, and backups 230 taken by the cluster 215-a may be replicated to the cluster 215-b and one or more other clusters 215 (e.g., and vice-versa). Each cluster 215 with a database 210 in the failover group 220 may accordingly access up-to-date back-ups 230 of the databases 210 of the failover group. For example, the cluster 215-*a* may obtain backups 230 of the database 210-*b* and may provide the backups 230 to the cluster 215-*b*. In some examples, the backups 230 of the database 210-*b* may be associated with an identifier that identifies the backups 230 as being backups 230 of the failover group 220. For example, the backups 230 of the database 210-*b* may include an identifier of the database 210-*b*. The cluster 215-*b* may determine that the identifier of the database 210-*b* is associated with the failover group 220, and may therefore determine that the backups 230 are for the failover group 220.

In some examples, to prevent a transaction log break and therefore prevent the cluster 215-*b* and/or the cluster 215-*a* from obtaining a full backup (e.g., a full snapshot), the cluster 215-*a* and the cluster 215-*b* may identify a priority for each database 210 to be a primary backup database (e.g., a primary database from which backups 230 are obtained). For example, a centralized control entity 225 (e.g., a cloud-based control entity) may receive a user input that assigns each database 210 a priority for being a primary backup database. As an illustrative example, the user may assign the database 210-*b* as a primary backup database and the database 210-*c* as a secondary backup database (e.g., a database from which the cluster 215-*b* may obtain backups in the event of a failover of the datacenter 205-*a*). The centralized control entity 225 may accordingly indicate for the cluster 215-*a* to obtain backups 230 from the database 210-*b* and to provide the backups 230 to the cluster 215-*b* (e.g., and for the cluster 215-*b* to obtain the backups 230 from the cluster 215-*a* and to refrain from obtaining backups 230 from the database 210-*c*).

In some examples, the cluster 215-*b* may identify the backups 230 of the database 210-*b* provided by the cluster 215-*a* as backups 230 that may satisfy an SLA assigned to the cluster 215-*b*. Accordingly, the cluster 215-*b* may satisfy the SLA without obtaining backups 230 of the database 210-*c*, which may prevent the cluster 215-*a* and the cluster 215-*b* from identifying transaction log breaks and therefore from obtaining full snapshots of the databases 210 and alerting the user to an error associated with the transaction log breaks.

In the event of a failover of the datacenter 205-*a*, the centralized control entity 225 may identify that the cluster 215-*b* is to obtain backups 230 from the database 210-*c*. For example, if the datacenter 205-*a* is unavailable (e.g., due to a power or network outage or destruction of the datacenter 205-*a*), the centralized control entity 225 may identify that the database 210-*c* is a new primary backup database (e.g., and/or a production database) based on the database 210-*c* being the secondary backup database prior to the failover event. The cluster 215-*b* may accordingly obtain backups 230 of the database 210-*c* and replicate the backups 230 to the cluster 215-*a*. In some examples (e.g., if a failover of the datacenter 205-*a* is planned), the user may configure one or more database settings for the primary backup database to remain in the datacenter 205-*a* or to move to the datacenter 205-*b*.

In some examples, the user may assign a linked SLA (e.g., a failover group-level SLA) that may apply to more than one cluster 215 with databases 210 that are part of a same failover group 220. For example, when assigning a first SLA to a cluster 215, the user may indicate one or more clusters 215 for which the user assigns the first SLA. Additionally, or alternatively, the user may indicate that an SLA is a failover group-level SLA that applies to all clusters 215 that include databases 210 in the failover group 220. Accordingly, in the event of a failover of the datacenter 205-*a*, the failover group-level SLA may automatically apply to the cluster 215-*b* (e.g., without further intervention of the user). The centralized control entity 225 may indicate for the cluster 215-*b* to obtain backups 230 of the database 210-*c* in accordance with the SLA and replicate the backups 230 to the cluster 215-*a*. The cluster 215-*a* may identify that the backups 230 satisfy the SLA based on identifying that the backups 230 are associated with the failover group 220 (e.g., based on an identifier associated with the backups 230) and may therefore refrain from obtaining backups 230 of the database 210-*a* and/or the database 210-*b*.

Figure 3:
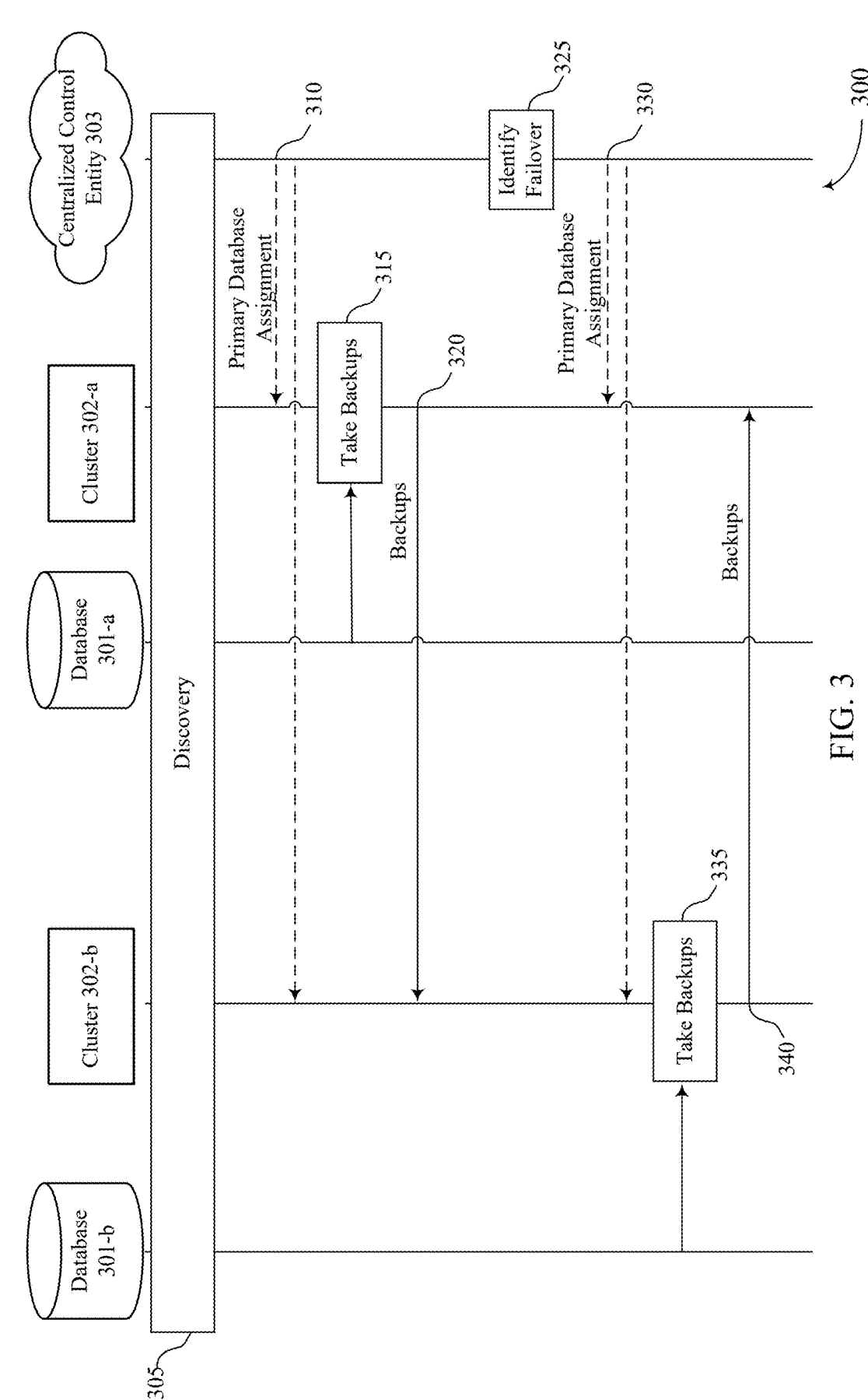
FIG. 3 shows an example of a process flow that supports coordinated backup of failover databases across multiple datacenters in accordance with aspects of the present disclosure.

FIG. 3 shows an example of a process flow 300 that supports coordinated backup of failover databases across multiple datacenters in accordance with aspects of the present disclosure. The process flow 300 may incorporate or be incorporated by aspects of the computing environment 100 or the computing environment 200. For example, the process flow 300 may include one or more databases 301 (e.g., a database 301-*a* and a database 301-*b* and one or more clusters 302 of storage nodes (e.g., a cluster 302-*a* and a cluster 302-*b*), which may be examples of the corresponding entities as described with reference to FIG. 1. In some examples, the clusters 302 described herein may be referred to as backup systems or storage nodes.

In the following description of the process flow 300, the operations between the database 301-*a*, the database 301-*b*, the cluster 302-*a*, the cluster 302-*b*, and the centralized control entity 303 may occur in a different order than the example order shown and, in some examples, may be performed by one or more different devices other than those shown as examples. Some operations also may be omitted from the process flow 300, and other operations may be added to the process flow 300. Further, although some operations or signaling may be shown to occur at different times for discussion purposes, these operations may actually occur at the same time.

At 305, the centralized control entity 303, the cluster 302-*a*, the database 301-*a*, the cluster 302-*b*, and the database 301-*b* may perform a discovery procedure to determine backup preferences and priorities of a user for the database 301-*a* and the database 301-*b*. For example, the centralized control entity 303 may identify that the database 301-*a* is in a first datacenter associated with the cluster 302-*a* and that the database 301-*b* is in a second datacenter associated with the cluster 302-*b*. The centralized control entity 303 may identify one or more priorities associated with obtaining backups from the database 301-*a* and the database 301-*b*. For example, the centralized control entity 303 may identify that the database 301-*a* is a primary backup database and the database 301-*b* is a secondary backup database.

Additionally, or alternatively, the centralized control entity 303, the cluster 302-*a*, and the cluster 302-*b* may identify that the database 301-*a* and the database 301-*b* are part of a same failover group (e.g., availability group) and may therefore be replicas of a same database (e.g., a production database). For example, the centralized control entity 303 may indicate to the cluster 302-*a* and the cluster 302-*b* that one or more databases in another datacenter are part of a same failover group. In some examples, the centralized control entity 303, the cluster 302-*a*, and/or the cluster 302-*b* may receive, via a user interface for a DMS that includes the cluster 302-*a* and the cluster 302-*b*, an indication of a set of backup parameters (e.g., an SLA) and/or an indication that the set of backup parameters applies to the both of the cluster 302-*a* and the cluster 302-*b*

(e.g., and to one or more additional clusters 302 associated with the failover group). For example, the user may indicate that the set of backup parameters applies to all clusters 302 associated with the failover group.

At 310, the centralized control entity 303 may indicate a primary backup database assignment to the cluster 302-*a* and/or the cluster 302-*b*. For example, the centralized control entity 303 may indicate that the cluster 302-*a* is to obtain transaction log backups of the database 301-*a* based on the database 301-*a* being the primary backup database. The centralized control entity 303 may indicate for the cluster 302-*a* to provide the transaction log backups of the database 301-*a* to the cluster 302-*b*.

At 315, the cluster 302-*a* may obtain backups of the database 301-*a*. For example, the cluster 302-*a* may request one or more transaction logs from the database 301-*a*. The database 301-*a* may truncate and provide the transaction logs to the cluster 302-*a* in response to the request. As described herein, the backups may be referred to as transaction log backups or incremental backups of the database 301-*a*.

At 320, the cluster 302-*a* may output, to the cluster 302-*b*, the backups of the database 301-*a*. In some examples, the one or more backups of the database 301-*a* may be associated with (e.g., include) an indication of an identifier associated with the database 301-*a*. The cluster 302-*b* may determine, based on the identifier associated with the database 301-*a* being associated with the failover group, that the backups of the database 301-*a* are associated with the failover group. In some examples, the cluster 302-*b* may store the backups of the database 301-*a*. The cluster 302-*b* may identify that the backups of the database 301-*a* satisfy the set of backup parameters. Accordingly, the cluster 302-*b* may refrain from obtaining backups of the database 301-*b* based on obtaining the backups of the database 301-*a*.

At 325, the centralized control entity 303 (e.g., and one or more other entities, such as the clusters 302 and the databases 301) may identify a failover of the first datacenter including the database 301-*a*. In some examples, the centralized control entity 303 may determine that the database 301-*b* is a new primary backup database based at least in part on the database 301-*b* being the secondary backup database prior to the failover. At 330, the centralized control entity 303 may indicate an updated primary backup database assignment to the cluster 302-*a* and/or the cluster 302-*b*. For example, the centralized control entity 303 may indicate that the cluster 302-*b* is to obtain transaction log backups of the database 301-*b* based on the database 301-*b* being the primary backup database. The centralized control entity 303 may indicate for the cluster 302-*b* to provide the transaction log backups of the database 301-*b* to the cluster 302-*a*.

At 335, the cluster 302-*b* may obtain backups of the database 301-*b*. For example, the cluster 302-*b* may request one or more transaction logs from the database 301-*b*. The database 301-*b* may truncate and provide the transaction logs to the cluster 302-*b* in response to the request. As described herein, the backups may be referred to as transaction log backups or incremental backups of the database 301-*b*. The cluster 302-*b* may use the backups of the database 301-*a* as a basis for the backups taken of the database 301-*b*.

At 340, the cluster 302-*b* may output, to the cluster 302-*a*, the backups of the database 301-*b*. In some examples, the one or more backups of the database 301-*b* may be associated with (e.g., include) an indication of an identifier associated with the database 301-*b*. The cluster 302-*a* may determine, based on the identifier associated with the database 301-*b* being associated with the failover group, that the backups of the database 301-*b* are associated with the failover group. In some examples, the cluster 302-*a* may store the backups of the database 301-*b*. The cluster 302-*a* may identify that the backups of the database 301-*a* satisfy the set of backup parameters. Accordingly, the cluster 302-*a* may refrain from obtaining backups of the database 301-*a* based on obtaining the backups of the database 301-*b*.

Figure 4:
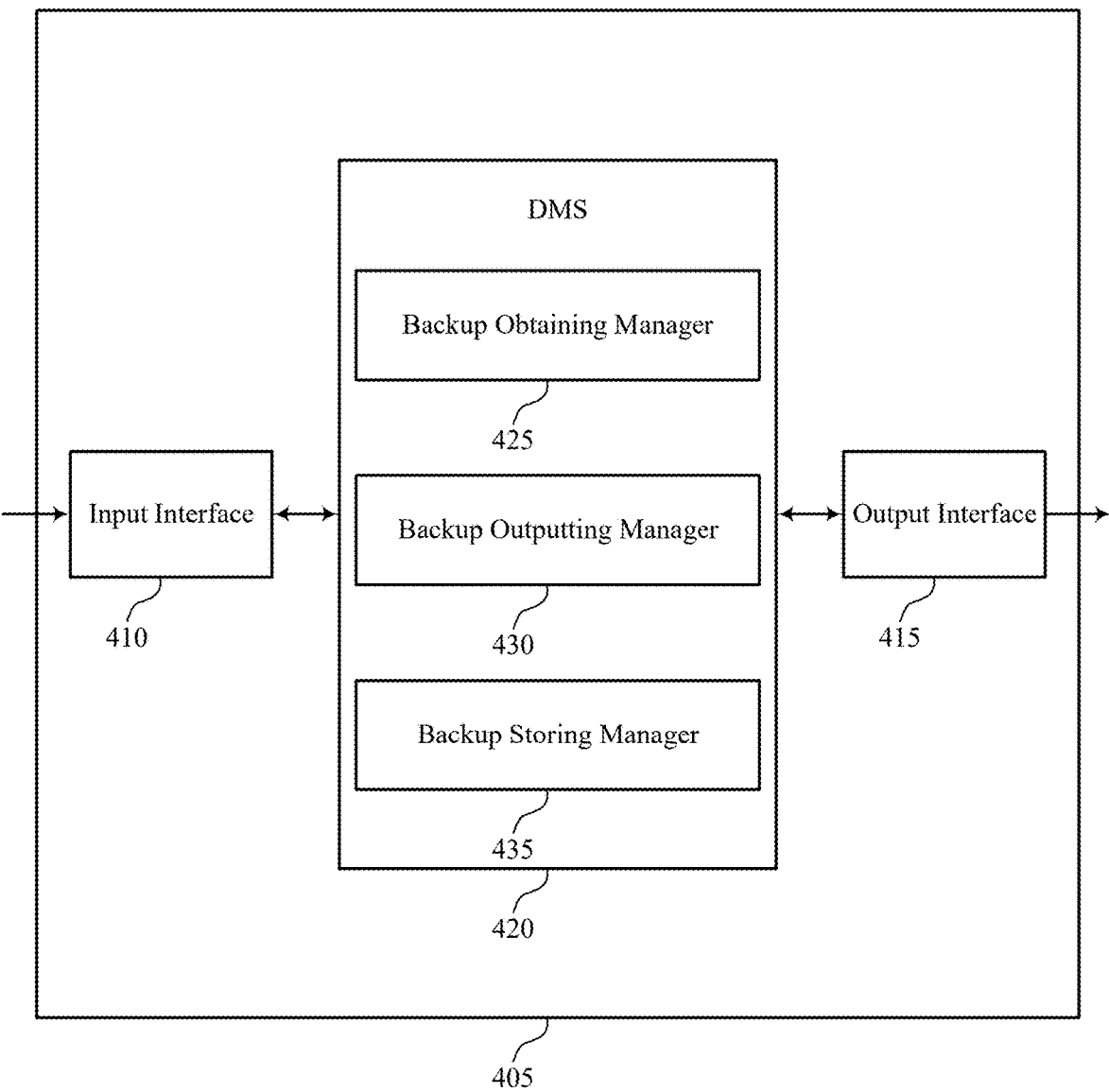
FIG. 4 shows a block diagram of an apparatus that supports coordinated backup of failover databases across multiple datacenters in accordance with aspects of the present disclosure.

FIG. 4 shows a block diagram 400 of a system 405 that supports coordinated backup of failover databases across multiple datacenters in accordance with aspects of the present disclosure. In some examples, the system 405 may be an example of aspects of one or more components described with reference to FIG. 1, such as a DMS 110. For example, the system 405 may include an input interface 410, an output interface 415, and a DMS 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the DMS 420 to support coordinated backup of failover databases across multiple datacenters. In some cases, the input interface 410 may be a component of a network interface 625 as described with reference to FIG. 6.

The output interface 415 may manage output signaling for the system 405. For example, the output interface 415 may receive signaling from other components of the system 405, such as the DMS 420, and may transmit such output signaling corresponding to (e.g., representative of or otherwise based on) such signaling to other systems or devices. In some cases, the output interface 415 may be a component of a network interface 625 as described with reference to FIG. 6.

For example, the DMS 420 may include a backup obtaining manager 425, a backup outputting manager 430, a backup storing manager 435, or any combination thereof. In some examples, the DMS 420, or various components thereof, may be configured to perform various operations (e.g., receiving, monitoring, transmitting) using or otherwise in cooperation with the input interface 410, the output interface 415, or both. For example, the DMS 420 may receive information from the input interface 410, send information to the output interface 415, or be integrated in combination with the input interface 410, the output interface 415, or both to receive information, transmit information, or perform various other operations as described herein.

The backup obtaining manager 425 may be configured as or otherwise support a means for obtaining, by a first backup system associated with a first datacenter, one or more backups of a first database within the first datacenter, where the first database is part of a failover group of databases that further includes a second database in a second datacenter. The backup outputting manager 430 may be configured as or otherwise support a means for outputting, by the first backup system associated with the first datacenter and based on the failover group including the second database in the second datacenter, the one or more backups of the first database to a second backup system associated with the second datacenter. The backup storing manager 435 may be configured as or otherwise support a means for storing, by the second backup system, the one or more backups of the first database output by the first backup system, where the second backup system is configured to obtain backups of the second database in accordance with a set of backup parameters associated with the second database, and where receipt by the second backup system of the one or more backups of the first database satisfies the set of backup parameters.

Figure 5:
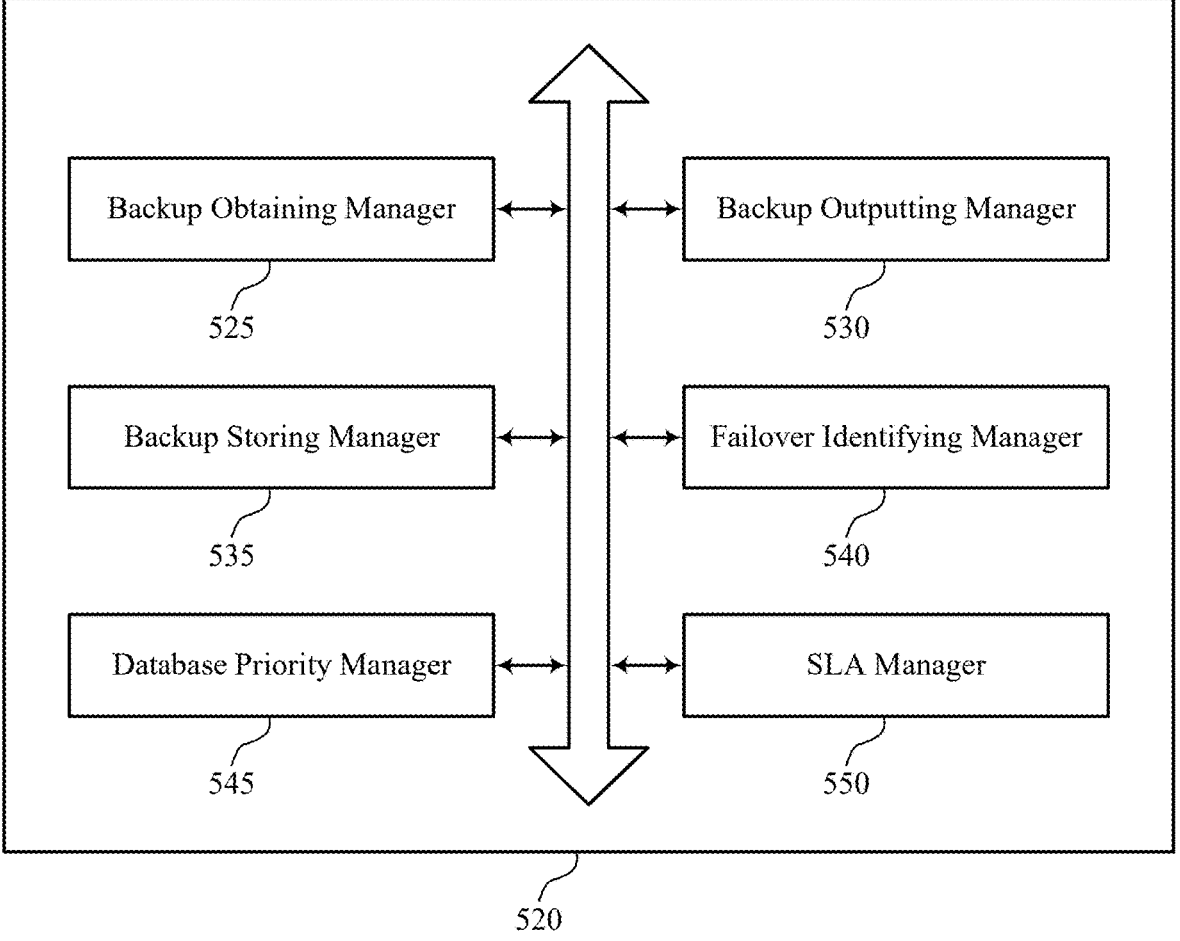
FIG. 5 shows a block diagram of a DMS that supports coordinated backup of failover databases across multiple datacenters in accordance with aspects of the present disclosure.

FIG. 5 shows a block diagram 500 of a DMS 520 that supports coordinated backup of failover databases across multiple datacenters in accordance with aspects of the present disclosure. The DMS 520 may be an example of aspects of a DMS 420, as described herein with reference to FIGS. 1 and 4. The DMS 520, or various components thereof, may be an example of means for performing various aspects of coordinated backup of failover databases across multiple datacenters as described herein. For example, the DMS 520 may include a backup obtaining manager 525, a backup outputting manager 530, a backup storing manager 535, a failover identifying manager 540, a database priority manager 545, an SLA manager 550, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The backup obtaining manager 525 may be configured as or otherwise support a means for obtaining, by a first backup system associated with a first datacenter, one or more backups of a first database within the first datacenter, where the first database is part of a failover group of databases that further includes a second database in a second datacenter. The backup outputting manager 530 may be configured as or otherwise support a means for outputting, by the first backup system associated with the first datacenter and based on the failover group including the second database in the second datacenter, the one or more backups of the first database to a second backup system associated with the second datacenter. The backup storing manager 535 may be configured as or otherwise support a means for storing, by the second backup system, the one or more backups of the first database output by the first backup system, where the second backup system is configured to obtain backups of the second database in accordance with a set of backup parameters associated with the second database, and where receipt by the second backup system of the one or more backups of the first database satisfies the set of backup parameters.

In some examples, the failover identifying manager 540 may be configured as or otherwise support a means for identifying that a failover event associated with the first datacenter has occurred. In some examples, the backup obtaining manager 525 may be configured as or otherwise support a means for obtaining, by the second backup system, one or more additional backups of the second database within the second datacenter based on occurrence of the failover event, where the one or more additional backups of the second database include one or more incremental backups or one or more transaction log backups that are based on the one or more backups of the first database. In some examples, the backup outputting manager 530 may be configured as or otherwise support a means for outputting, by the second backup system associated with the second datacenter, the one or more additional backups of the second database to the first backup system associated with the first datacenter.

In some examples, the database priority manager 545 may be configured as or otherwise support a means for identifying, by a centralized control entity for a data management system that includes the first backup system and the second backup system, that the first database is a primary backup database of the failover group and that the second database is a secondary backup database of the failover group.

In some examples, the database priority manager 545 may be configured as or otherwise support a means for outputting, by the centralized control entity to the first backup system, an indication to obtain the one or more backups of the first database based on identifying that the first database is the primary backup database of the failover group.

In some examples, the database priority manager 545 may be configured as or otherwise support a means for outputting, by the centralized control entity to the second backup system, an indication to obtain the one or more additional backups of the second database based on identifying that the second database has become a primary backup database after the failover event.

In some examples, the one or more backups of the first database are associated with an identifier for the first database, and the backup obtaining manager 525 may be configured as or otherwise support a means for identifying, by the second backup system, that the one or more backups of the first database are associated with the failover group based on the identifier for the first database being associated with the failover group.

In some examples, the set of backup parameters associated with the second database is also associated with the first database based on the first database and the second database both being in the failover group.

In some examples, the SLA manager 550 may be configured as or otherwise support a means for receiving, via a user interface for a data management system that includes the first backup system and the second backup system, an indication that the set of backup parameters applies to all databases within the failover group.

In some examples the second backup system is configured to refrain, in response to receipt by the second backup system of the one or more backups of the first database from the first backup system, from attempting to obtain the one or more backups of the second database from the second database.

In some examples, the first backup system and the second backup system include respective clusters of storage nodes.

Figure 6:
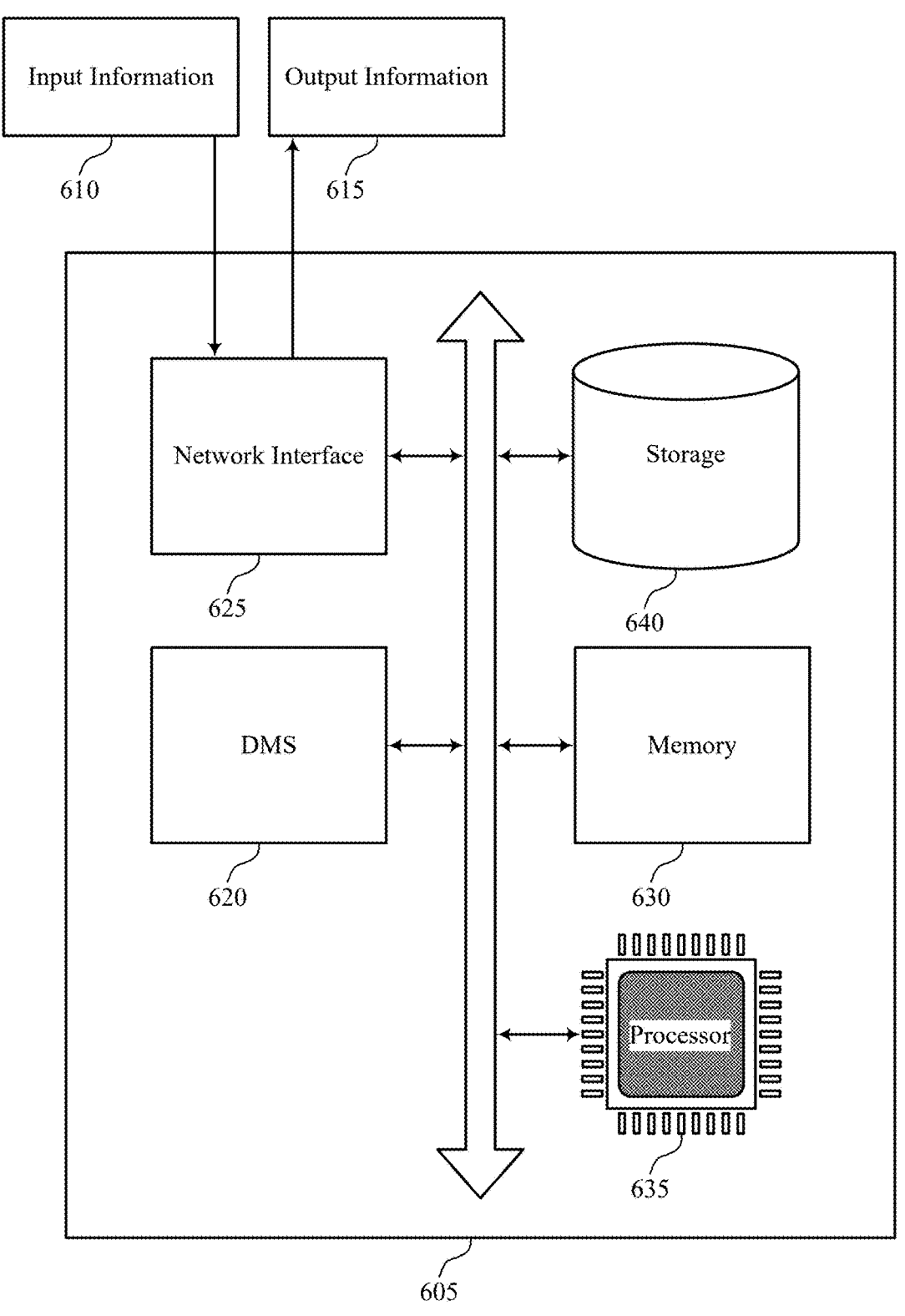
FIG. 6 shows a diagram of a system including a device that supports coordinated backup of failover databases across multiple datacenters in accordance with aspects of the present disclosure.

FIG. 6 shows a block diagram 600 of a system 605 that supports coordinated backup of failover databases across multiple datacenters in accordance with aspects of the present disclosure. The system 605 may be an example of or include components of a system 405 as described herein. The system 605 may include components for data management, including components such as a DMS 620, an input information 610, an output information 615, a network interface 625, at least one memory 630, at least one processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting coordinated backup of failover databases across multiple datacenters). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the DMS 620 may be configured as or otherwise support a means for obtaining, by a first backup system associated with a first datacenter, one or more backups of a first database within the first datacenter, where the first database is part of a failover group of databases that further includes a second database in a second datacenter. The DMS 620 may be configured as or otherwise support a means for outputting, by the first backup system associated with the first datacenter and based on the failover group including the second database in the second datacenter, the one or more backups of the first database to a second backup system associated with the second datacenter. The DMS 620 may be configured as or otherwise support a means for storing, by the second backup system, the one or more backups of the first database output by the first backup system, where the second backup system is configured to obtain backups of the second database in accordance with a set of backup parameters associated with the second database, and where receipt by the second backup system of the one or more backups of the first database satisfies the set of backup parameters.

By including or configuring the DMS 620 in accordance with examples as described herein, the system 605 may support techniques for coordinated backup of failover databases across multiple datacenters, which may provide one or more benefits such as, for example, improved reliability, improved user experience, reduced power consumption, reduced processing, and more efficient utilization of computing resources, among other possibilities.

FIG. 7 shows a flowchart illustrating a method 700 that supports coordinated backup of failover databases across multiple datacenters in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include obtaining, by a first backup system associated with a first datacenter, one or more backups of a first database within the first datacenter, where the first database is part of a failover group of databases that further includes a second database in a second datacenter. The operations of 705 may be performed in accordance with examples as disclosed herein. In some examples, aspects of the operations of 705 may be performed by a backup obtaining manager 525 as described with reference to FIG. 5.

At 710, the method may include outputting, by the first backup system associated with the first datacenter and based on the failover group including the second database in the second datacenter, the one or more backups of the first database to a second backup system associated with the second datacenter. The operations of 710 may be performed in accordance with examples as disclosed herein. In some examples, aspects of the operations of 710 may be performed by a backup outputting manager 530 as described with reference to FIG. 5.

At 715, the method may include storing, by the second backup system, the one or more backups of the first database output by the first backup system, where the second backup system is configured to obtain backups of the second database in accordance with a set of backup parameters associated with the second database, and where receipt by the second backup system of the one or more backups of the first database satisfies the set of backup parameters. The operations of 715 may be performed in accordance with examples as disclosed herein. In some examples, aspects of the operations of 715 may be performed by a backup storing manager 535 as described with reference to FIG. 5.

FIG. 8 shows a flowchart illustrating a method 800 that supports coordinated backup of failover databases across multiple datacenters in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include obtaining, by a first backup system associated with a first datacenter, one or more backups of a first database within the first datacenter, where the first database is part of a failover group of databases that further includes a second database in a second datacenter. The operations of 805 may be performed in accordance with examples as disclosed herein. In some examples, aspects of the operations of 805 may be performed by a backup obtaining manager 525 as described with reference to FIG. 5.

At 810, the method may include outputting, by the first backup system associated with the first datacenter and based on the failover group including the second database in the second datacenter, the one or more backups of the first database to a second backup system associated with the second datacenter. The operations of 810 may be performed in accordance with examples as disclosed herein. In some examples, aspects of the operations of 810 may be performed by a backup outputting manager 530 as described with reference to FIG. 5.

At 815, the method may include storing, by the second backup system, the one or more backups of the first database output by the first backup system, where the second backup system is configured to obtain backups of the second database in accordance with a set of backup parameters associated with the second database, and where receipt by the second backup system of the one or more backups of the first database satisfies the set of backup parameters. The operations of 815 may be performed in accordance with examples as disclosed herein. In some examples, aspects of the operations of 815 may be performed by a backup storing manager 535 as described with reference to FIG. 5.

At 820, the method may include identifying that a failover event associated with the first datacenter has occurred. The operations of 820 may be performed in accordance with examples as disclosed herein. In some examples, aspects of the operations of 820 may be performed by a failover identifying manager 540 as described with reference to FIG. 5.

At 825, the method may include obtaining, by the second backup system, one or more additional backups of the second database within the second datacenter based on occurrence of the failover event, where the one or more additional backups of the second database include one or more incremental backups or one or more transaction log backups that are based on the one or more backups of the first database. The operations of 825 may be performed in accordance with examples as disclosed herein. In some examples, aspects of the operations of 825 may be performed by a backup obtaining manager 525 as described with reference to FIG. 5.

At 830, the method may include outputting, by the second backup system associated with the second datacenter, the one or more additional backups of the second database to the first backup system associated with the first datacenter. The operations of 830 may be performed in accordance with examples as disclosed herein. In some examples, aspects of the operations of 830 may be performed by a backup outputting manager 530 as described with reference to FIG. 5.

A method by an apparatus is described. The method may include obtaining, by a first backup system associated with a first datacenter, one or more backups of a first database within the first datacenter, where the first database is part of a failover group of databases that further includes a second database in a second datacenter, outputting, by the first backup system associated with the first datacenter and based on the failover group including the second database in the second datacenter, the one or more backups of the first database to a second backup system associated with the second datacenter, and storing, by the second backup system, the one or more backups of the first database output by the first backup system, where the second backup system is configured to obtain backups of the second database in accordance with a set of backup parameters associated with the second database, and where receipt by the second backup system of the one or more backups of the first database satisfies the set of backup parameters.

An apparatus is described. The apparatus may include one or more memories storing processor executable code, and one or more processors coupled with the one or more memories. The one or more processors may individually or collectively be operable to execute the code to cause the apparatus to obtain, by a first backup system associated with a first datacenter, one or more backups of a first database within the first datacenter, where the first database is part of a failover group of databases that further includes a second database in a second datacenter, output, by the first backup system associated with the first datacenter and based on the failover group including the second database in the second datacenter, the one or more backups of the first database to a second backup system associated with the second datacenter, and store, by the second backup system, the one or more backups of the first database output by the first backup system, where the second backup system is configured to obtain backups of the second database in accordance with a set of backup parameters associated with the second database, and where receipt by the second backup system of the one or more backups of the first database satisfies the set of backup parameters.

Another apparatus is described. The apparatus may include means for obtaining, by a first backup system associated with a first datacenter, one or more backups of a first database within the first datacenter, where the first database is part of a failover group of databases that further includes a second database in a second datacenter, means for outputting, by the first backup system associated with the first datacenter and based on the failover group including the second database in the second datacenter, the one or more backups of the first database to a second backup system associated with the second datacenter, and means for storing, by the second backup system, the one or more backups of the first database output by the first backup system, where the second backup system is configured to obtain backups of the second database in accordance with a set of backup parameters associated with the second database, and where receipt by the second backup system of the one or more backups of the first database satisfies the set of backup parameters.

A non-transitory computer-readable medium storing code is described. The code may include instructions executable by one or more processors to obtain, by a first backup system associated with a first datacenter, one or more backups of a first database within the first datacenter, where the first database is part of a failover group of databases that further includes a second database in a second datacenter, output, by the first backup system associated with the first datacenter and based on the failover group including the second database in the second datacenter, the one or more backups of the first database to a second backup system associated with the second datacenter, and store, by the second backup system, the one or more backups of the first database output by the first backup system, where the second backup system is configured to obtain backups of the second database in accordance with a set of backup parameters associated with the second database, and where receipt by the second backup system of the one or more backups of the first database satisfies the set of backup parameters.

Some examples of the method, apparatus, and non-transitory computer-readable medium described herein may further include operations, features, means, or instructions for identifying that a failover event associated with the first datacenter may have occurred, obtaining, by the second backup system, one or more additional backups of the second database within the second datacenter based on occurrence of the failover event, where the one or more additional backups of the second database include one or more incremental backups or one or more transaction log backups that may be based on the one or more backups of the first database, and outputting, by the second backup system associated with the second datacenter, the one or more additional backups of the second database to the first backup system associated with the first datacenter.

Some examples of the method, apparatus, and non-transitory computer-readable medium described herein may further include operations, features, means, or instructions for identifying, by a centralized control entity for a data management system that includes the first backup system and the second backup system, that the first database is a primary backup database of the failover group and that the second database is a secondary backup database of the failover group.

Some examples of the method, apparatus, and non-transitory computer-readable medium described herein may further include operations, features, means, or instructions for outputting, by the centralized control entity to the first backup system, an indication to obtain the one or more backups of the first database based on identifying that the first database is the primary backup database of the failover group.

Some examples of the method, apparatus, and non-transitory computer-readable medium described herein may further include operations, features, means, or instructions for outputting, by the centralized control entity to the second backup system, an indication to obtain the one or more additional backups of the second database based on identifying that the second database has become a primary backup database after the failover event.

In some examples of the method, apparatus, and non-transitory computer-readable medium described herein, the one or more backups of the first database are associated with an identifier for the first database and the method, apparatuses, and non-transitory computer-readable medium may include further operations, features, means, or instructions for identifying, by the second backup system, that the one or more backups of the first database are associated with the failover group based on the identifier for the first database being associated with the failover group.

In some examples of the method, apparatus, and non-transitory computer-readable medium described herein, the set of backup parameters associated with the second database is also associated with the first database based on the first database and the second database both being in the failover group.

Some examples of the method, apparatus, and non-transitory computer-readable medium described herein may further include operations, features, means, or instructions for receiving, via a user interface for a data management system that includes the first backup system and the second backup system, an indication that the set of backup parameters applies to all databases within the failover group.

In some examples of the method, apparatus, and non-transitory computer-readable medium described herein, the second backup system is configured to refrain, in response to receipt by the second backup system of the one or more backups of the first database from the first backup system, from attempting to obtain the one or more backups of the second database from the second database.

In some examples of the method, apparatus, and non-transitory computer-readable medium described herein, the first backup system and the second backup system include respective clusters of storage nodes.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
obtaining, by a first backup system associated with a first datacenter, one or more backups of a first database within the first datacenter, wherein the first database is part of a failover group of databases that further comprises a second database in a second datacenter, the failover group of databases comprising a set of databases that are replicas of a same primary database;
outputting, by the first backup system associated with the first datacenter and based at least in part on the failover group comprising the second database in the second datacenter, the one or more backups of the first database to a second backup system associated with the second datacenter; and
storing, by the second backup system, the one or more backups of the first database output by the first backup system, wherein the second backup system is configured to obtain backups of the second database in accordance with a set of backup parameters associated with the second database, and wherein receipt by the second backup system of the one or more backups of the first database satisfies the set of backup parameters.

2. The method of claim 1, further comprising:
identifying that a failover event associated with the first datacenter has occurred;
obtaining, by the second backup system, one or more additional backups of the second database within the second datacenter based at least in part on occurrence of the failover event, wherein the one or more additional backups of the second database comprise one or more incremental backups or one or more transaction log backups that are based at least in part on the one or more backups of the first database; and
outputting, by the second backup system associated with the second datacenter, the one or more additional backups of the second database to the first backup system associated with the first datacenter.

3. The method of claim 2, further comprising:
identifying, by a centralized control entity for a data management system that comprises the first backup system and the second backup system, that the first database is a primary backup database of the failover group and that the second database is a secondary backup database of the failover group.

4. The method of claim 3, further comprising:
outputting, by the centralized control entity to the first backup system, an indication to obtain the one or more backups of the first database based at least in part on identifying that the first database is the primary backup database of the failover group.

5. The method of claim 3, further comprising:

outputting, by the centralized control entity to the second backup system, an indication to obtain the one or more additional backups of the second database based at least in part on identifying that the second database has become a primary backup database after the failover event.

6. The method of claim 1, wherein the one or more backups of the first database are associated with an identifier for the first database, the method further comprising:

identifying, by the second backup system, that the one or more backups of the first database are associated with the failover group based at least in part on the identifier for the first database being associated with the failover group.

7. The method of claim 1, wherein the set of backup parameters associated with the second database is also associated with the first database based at least in part on the first database and the second database both being in the failover group.

8. The method of claim 7, further comprising:

receiving, via a user interface for a data management system that comprises the first backup system and the second backup system, an indication that the set of backup parameters applies to all databases within the failover group.

9. The method of claim 1, wherein the second backup system is configured to refrain, in response to receipt by the second backup system of the one or more backups of the first database from the first backup system, from attempting to obtain one or more backups of the second database from the second database.

10. The method of claim 1, wherein the first backup system and the second backup system comprise respective clusters of storage nodes.

11. An apparatus, comprising:

one or more memories storing processor-executable code; and one or more processors coupled with the one or more memories and individually or collectively operable to execute the code to cause the apparatus to:

obtain, by a first backup system associated with a first datacenter, one or more backups of a first database within the first datacenter, wherein the first database is part of a failover group of databases that further comprises a second database in a second datacenter, the failover group of databases comprising a set of databases that are replicas of a same primary database;

output, by the first backup system associated with the first datacenter and based at least in part on the failover group comprising the second database in the second datacenter, the one or more backups of the first database to a second backup system associated with the second datacenter; and store, by the second backup system, the one or more backups of the first database output by the first backup system, wherein the second backup system is configured to obtain backups of the second database in accordance with a set of backup parameters associated with the second database, and wherein receipt by the second backup system of the one or more backups of the first database satisfies the set of backup parameters.

12. The apparatus of claim 11, wherein the one or more processors are individually or collectively further operable to execute the code to cause the apparatus to:

identify that a failover event associated with the first datacenter has occurred;

obtain, by the second backup system, one or more additional backups of the second database within the second datacenter based at least in part on occurrence of the failover event, wherein the one or more additional backups of the second database comprise one or more incremental backups or one or more transaction log backups that are based at least in part on the one or more backups of the first database; and output, by the second backup system associated with the second datacenter, the one or more additional backups of the second database to the first backup system associated with the first datacenter.

13. The apparatus of claim 12, wherein the one or more processors are individually or collectively further operable to execute the code to cause the apparatus to:

identify, by a centralized control entity for a data management system that comprises the first backup system and the second backup system, that the first database is a primary backup database of the failover group and that the second database is a secondary backup database of the failover group.

14. The apparatus of claim 13, wherein the one or more processors are individually or collectively further operable to execute the code to cause the apparatus to:

output, by the centralized control entity to the first backup system, an indication to obtain the one or more backups of the first database based at least in part on identifying that the first database is the primary backup database of the failover group.

15. The apparatus of claim 13, wherein the one or more processors are individually or collectively further operable to execute the code to cause the apparatus to:

output, by the centralized control entity to the second backup system, an indication to obtain the one or more additional backups of the second database based at least in part on identifying that the second database has become a primary backup database after the failover event.

16. The apparatus of claim 11, wherein the one or more backups of the first database are associated with an identifier for the first database, and wherein the one or more processors are individually or collectively further operable to execute the code to cause the apparatus to:

identify, by the second backup system, that the one or more backups of the first database are associated with the failover group based at least in part on the identifier for the first database being associated with the failover group.

17. The apparatus of claim 11, wherein the set of backup parameters associated with the second database is also associated with the first database based at least in part on the first database and the second database both being in the failover group.

18. The apparatus of claim 17, wherein the one or more processors are individually or collectively further operable to execute the code to cause the apparatus to:

receive, via a user interface for a data management system that comprises the first backup system and the second backup system, an indication that the set of backup parameters applies to all databases within the failover group.

19. The apparatus of claim 11, wherein the second backup system is configured to refrain, in response to receipt by the second backup system of the one or more backups of the first database from the first backup system, from attempting to obtain the one or more backups of the second database from the second database.

20. A non-transitory computer-readable medium storing code, the code comprising instructions executable by one or more processors to:

obtain, by a first backup system associated with a first datacenter, one or more backups of a first database within the first datacenter, wherein the first database is part of a failover group of databases that further comprises a second database in a second datacenter, the failover group of databases comprising a set of databases that are replicas of a same primary database;

output, by the first backup system associated with the first datacenter and based at least in part on the failover group comprising the second database in the second datacenter, the one or more backups of the first database to a second backup system associated with the second datacenter; and store, by the second backup system, the one or more backups of the first database output by the first backup system, wherein the second backup system is configured to obtain backups of the second database in accordance with a set of backup parameters associated with the second database, and wherein receipt by the second backup system of the one or more backups of the first database satisfies the set of backup parameters.

* * * * *